(12) United States Patent
Katada et al.

(10) Patent No.: US 7,548,570 B2
(45) Date of Patent: Jun. 16, 2009

(54) LASER POWER CONTROL APPARATUS

(75) Inventors: Masamichi Katada, Osaka (JP);
Motonori Taniguchi, Kyoto (JP)

(73) Assignee: Panasonic Corporation, Osaka (JP)

( * ) Notice: Subject to any disclaimer, the term of this patent is extended or adjusted under 35 U.S.C. 154(b) by 238 days.

(21) Appl. No.: 11/812,292

(22) Filed: Jun. 18, 2007

(65) Prior Publication Data

US 2007/0248129 A1 Oct. 25, 2007

Related U.S. Application Data

(62) Division of application No. 10/886,589, filed on Jul. 9, 2004, now abandoned.

(30) Foreign Application Priority Data

Sep. 4, 2003 (JP) .............................. 2003-313065

(51) Int. Cl.
*H01S 3/10* (2006.01)
*H01S 3/13* (2006.01)
*H01S 3/00* (2006.01)

(52) U.S. Cl. ................... 372/38.02; 372/9; 372/29.01; 372/29.011; 372/29.012; 372/29.014; 372/29.02; 372/29.021; 372/31; 372/38.1; 372/38.01; 372/38.04

(58) Field of Classification Search ............. 372/9, 372/29.01, 29.011, 29.012, 29.014, 29.02, 372/29.021, 31, 38.1, 38.01, 38.02, 38.04
See application file for complete search history.

(56) References Cited

U.S. PATENT DOCUMENTS

| 6,724,793 | B2 | 4/2004 | Nagara |
| 6,738,339 | B2 | 5/2004 | Gyo |
| 2001/0020670 | A1 | 9/2001 | Hyoga |
| 2002/0186635 | A1 | 12/2002 | Eda |
| 2003/0002552 | A1* | 1/2003 | Nagara .................... 372/38.02 |
| 2004/0165502 | A1 | 8/2004 | Nagara |
| 2004/0196772 | A1 | 10/2004 | Gyo |
| 2004/0196773 | A1 | 10/2004 | Gyo |
| 2006/0158984 | A1 | 7/2006 | Nagara |

FOREIGN PATENT DOCUMENTS

| EP | 1 067 529 A2 | 1/2001 |
| EP | 1 170 840 A1 | 1/2002 |
| JP | 2001-236726 | 8/2001 |
| JP | 2003-6905 | 1/2003 |
| JP | 2003-228867 | 8/2003 |
| WO | WO 03/050808 A1 | 6/2003 |

OTHER PUBLICATIONS

Japanese Office Action, issued in Japanese Patent Application No. JP 2003-313065 dated on Jan. 30, 3009.
European Search Report issued in European Patent Application No. EP 04 01 4731, dated Aug. 1, 2007.
Japanese Office Action, with partial English translation issued in Japanese Patent Application No. JP 2003-313065 dated on May 1, 2008.

* cited by examiner

*Primary Examiner*—Kenneth A Parker
*Assistant Examiner*—Hrayr A Sayadian
(74) *Attorney, Agent, or Firm*—McDermott Will & Emery LLP

(57) ABSTRACT

In a laser power control apparatus for controlling a laser power of a combination drive, first laser light Lc applied onto a first optical disk and second laser light Ld applied onto a second optical disk is collected by one photodetector 8.

3 Claims, 17 Drawing Sheets

LASER POWER CONTROL APPARATUS

RELATED APPLICATION

This application is a divisional of application Ser. No. 10/886,589, FILED Jul. 9, 2004 now abandoned, which claims priority of Japanese Application No. 2003-313065, filed Sep. 4, 2003, the entire contents of which are hereby incorporated by reference.

BACKGROUND OF THE INVENTION

1. Field of the Invention

The present invention relates to a laser power control apparatus for controlling laser power in a combination drive which records information or reads recorded information on/from different types of optical disks by applying different laser lights onto the optical disks. More particularly, the present invention relates to a laser power control apparatus for controlling the laser power such that the different laser lights are collected by a common photodetector.

2. Description of the Background Art

In recent years, combination drives which are capable of reading recorded information or writing information using plural types of optical disks have been widely used. The combination drive may be generally represented by one that records and reproduces information on CDs and reproduces information on DVDs, as suggested in Japanese Patent Laid-Open Publication No. 2001-236726, for example. In such a combination drive, two lasers of different powers, a CD laser and a DVD laser, need to be controlled individually.

Referring to FIG. 17, a laser power control apparatus in a conventional combination drive will be described. A laser power control apparatus LP includes a CD laser power control system LPcd for controlling the power of a CD laser; a DVD laser power control system LPdvd for controlling the power of a DVD laser; and a controller 100 for controlling the operation of the entire laser power control apparatus LP.

The CD laser power control system LPcd includes an offset adjuster 1 (referred to as "Offset" in the drawing), an adder 20, a reproduction amplification unit Up, a recording amplification unit Ur, a laser drive circuit 7 (referred to as "LDD" in the drawing), a laser diode LD1, and a front monitor 8 (referred to as "PD" in the drawing). The laser drive circuit 7 allows the laser diode LD1 to emit CD laser light Lc having a predetermined amount of light, based on a reproduction laser drive control signal LDI1 supplied from the reproduction amplification unit Up or on a recording laser drive control signal LDI3 supplied from the recording amplification unit Ur.

The front monitor 8 is composed of a photodetector. The front monitor 8 collects the CD laser light Lc and generates a laser intensity signal PD01 having a voltage which is based on the amount of the light collected. The offset adjuster 1 adds a potential which corresponds to a predetermined offset value to the laser intensity signal PD01 through the adder 20, thereby generating an offset corrected laser intensity signal S1.

The reproduction amplification unit Up has a variable gain circuit 2p (referred to as "VGA" in the drawing), a sample/hold circuit 3p (referred to as "S/H" in the drawing), and an operational amplifier 4p. The variable gain circuit 2p functions so that the laser intensity signal S1 has a sufficient amplitude at reproduction, thereby generating a laser intensity signal S2p. The sample/hold circuit 3p samples and holds the laser intensity signal S2p at a predetermined timing, thereby generating a laser intensity signal S3p. The operational amplifier 4p compares between a reference potential Vp supplied from a variable voltage source 5p and the laser intensity signal S3p and then generates a reproduction laser drive control signal LDI1 based on the difference obtained from the comparison.

The recording amplification unit Ur has a variable gain circuit 2r, a sample/hold circuit 3r, an operational amplifier 4r, and a variable voltage source 5r, as does the reproduction amplification unit Up. The variable gain circuit 2r functions so that the laser intensity signal S1 has a sufficient amplitude at recording, thereby generating a laser intensity signal S2r. The sample/hold circuit 3r samples and holds the laser intensity signal S2r at a predetermined timing, thereby generating a laser intensity signal S3r. The operational amplifier 4r compares between a reference potential Vr supplied from a variable voltage source 5r and the laser intensity signal S3r and then generates a recording laser drive control signal LDI3 based on the difference obtained from the comparison.

Note that the reproduction amplification unit Up and the recording amplification unit Ur have basically the same configuration and function except that the reproduction laser drive control signal LDI1 and the recording laser drive control signal LDI3 generated by the reproduction amplification unit Up and the recording amplification unit Ur, respectively, have different levels. Therefore, the reproduction amplification unit Up and the recording amplification unit Ur are hereinafter collectively referred to as an "amplification unit U" as long as there is no particular problem. In addition, the variable gain circuits 2p and 2r are hereinafter collectively referred to as a "variable gain circuit 2", the sample/hold circuits 3p and 3r referred to as a "sample/hold circuit 3", the operational amplifiers 4p and 4r referred to as an "operational amplifier 4", and the variable voltage sources 5p and 5r referred to as a "variable voltage source 5". The reproduction laser drive control signal LDI1 and the recording laser drive control signal LDI3 are hereinafter collectively referred to as a "CD laser drive control signal LDIc".

The DVD laser power control system LPdvd has an operational amplifier 6, a transistor PNP, a laser diode LD2, and a back monitor 19 (referred to as "PD" in the drawing). The transistor PNP allows the laser diode LD2 to emit DVD laser light Ld having a predetermined amount of light, based on a reproduction laser drive control signal LDI2 supplied from the operational amplifier 6. The back monitor 19 is composed of a photodetector, as is the front monitor 8. The back monitor 19 collects the DVD laser light Ld and generates a laser intensity signal PD02 having a voltage which is based on the amount of the light collected. The operational amplifier 6 compares the laser intensity signal PD02 to a reference signal PD2ref and then generates a reproduction laser drive control signal LDI2 based on the difference obtained from the comparison.

To the controller 100 a feedback signal Sf which indicates the operational conditions of the components of the laser power control apparatus LP is inputted from the laser power control apparatus LP. Further, to the controller 100 an operation mode signal Sm which indicates a user's instruction is inputted from the combination drive. The controller 100 generates a control signal Sc for controlling the operation of each component of the laser power control apparatus LP, based on the operation mode signal Sm and the feedback signal Sf.

As described above, in the conventional combination drive, the CD laser power control system LPcd and the DVD laser power control system LPdvd are independently configured, and thus a space-consuming photodetector is redundantly provided on each of the font and back monitors, which inhibits production of a small size combination drive.

SUMMARY OF THE INVENTION

Therefore, an object of the present invention is to provide a small size laser power control apparatus obtained by providing commonality of redundantly provided front and back monitors. The present invention has the following features to attain the object mentioned above.

A first aspect of the present invention is directed to a laser power control apparatus for controlling an output of laser light which is exclusively applied onto a first optical disk and a second optical disk in a combination drive to record or read information thereon or therefrom, the apparatus comprising: a first laser light generator for generating first laser light to be applied onto the first optical disk; a first drive current generator for generating a drive current of the first laser light generator; a second laser light generator for generating second laser light to be applied onto the second optical disk; a second drive current generator for generating a drive current of the second laser light generator; a laser light intensity detector for exclusively collecting the first laser light and the second laser light and generating a first laser light intensity signal which indicates an intensity of the collected laser light; a first laser light generating current controller for controlling the first laser light generator based on the first laser light intensity signal; and a second laser light generating current controller for controlling the second laser light generator based on the first laser light intensity signal.

As described above, in the present invention, in the combination drive capable of reproducing or recording information on plural types of optical disks, only one photodetector is provided which collects laser light to control the power of the laser light, thereby making it possible to produce a compact laser power control apparatus.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
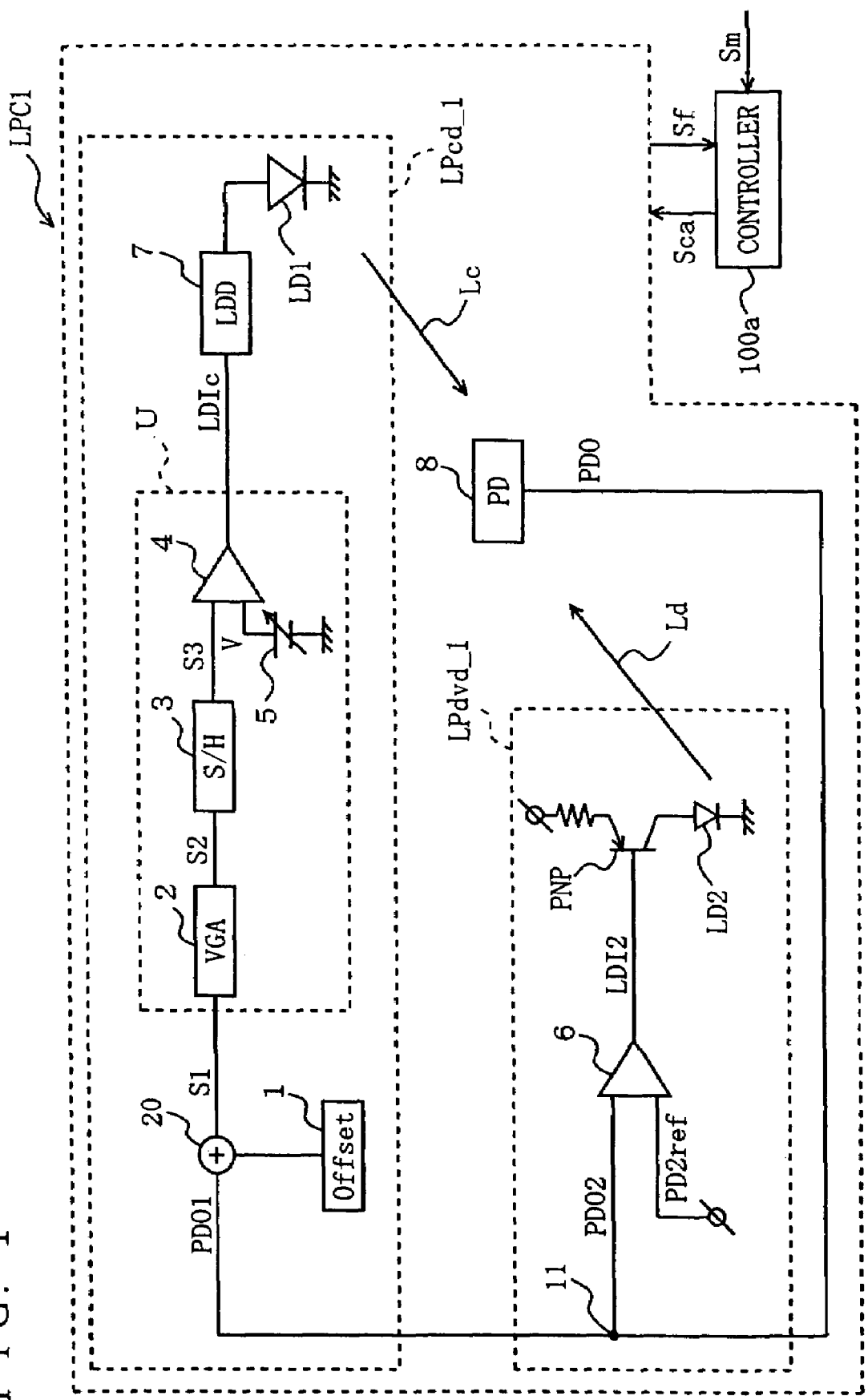
FIG. 1 is a block diagram illustrating a configuration of a laser power control apparatus according to a first embodiment of the present invention.
Figure 17:
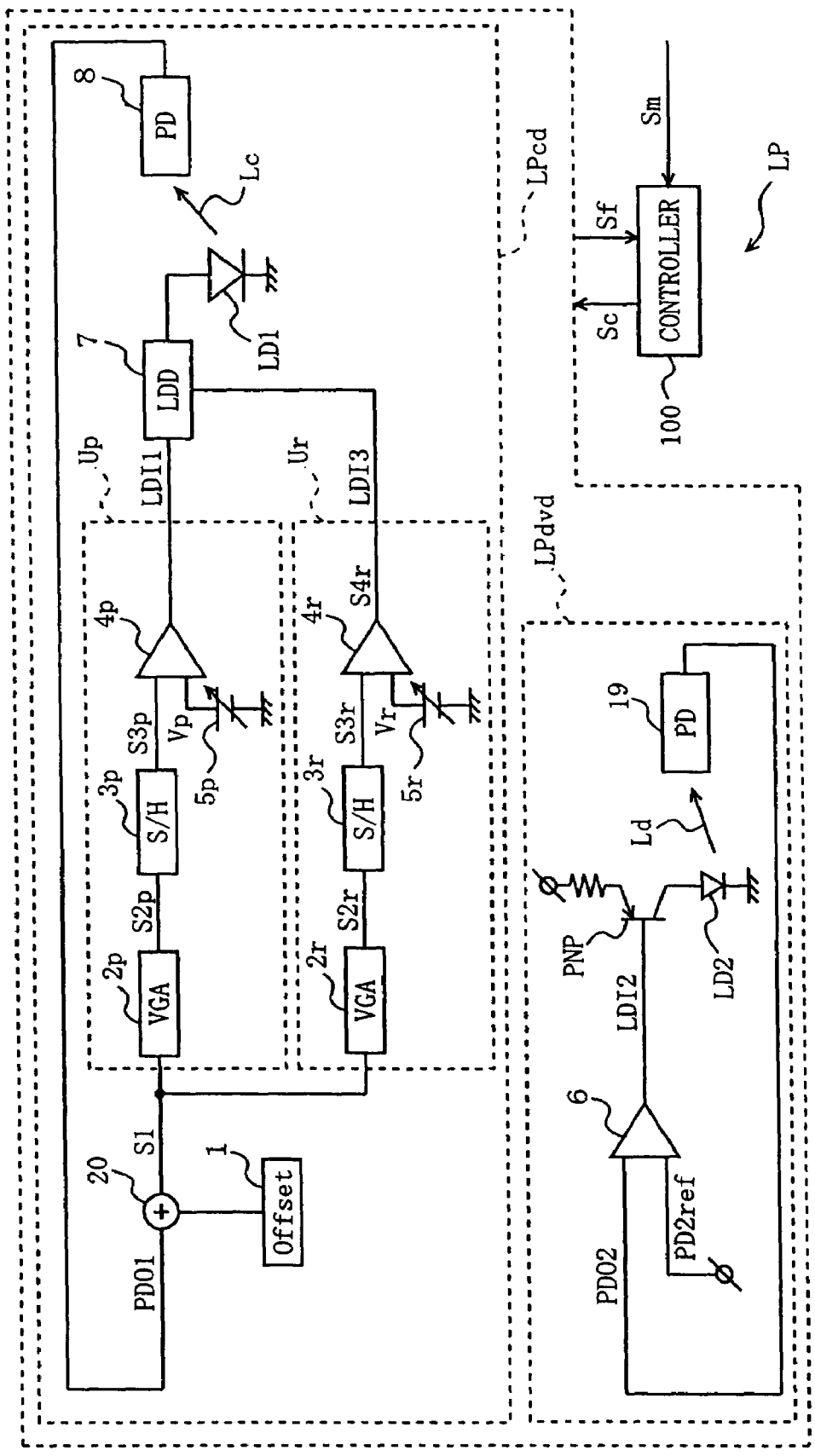
FIG. 17 is a block diagram illustrating a configuration of a laser power control apparatus used in a conventional combination drive.

Referring to FIG. 1, a laser power control apparatus according to a first embodiment of the present invention will be described. Put simply, a laser power control apparatus LPC1 has a configuration such that in the conventional laser power control apparatus LP, shown in FIG. 17, the back monitor 19 of the DVD laser power control system LPdvd is eliminated, and the CD laser power control system LPcd and the DVD laser power control system LPdvd are connected to each other at a junction 11. In addition, the controller 100 is replaced with a controller 100a.

Specifically, in the laser power control apparatus LPC1, a DVD laser power control unit LPdvd_1 configured by eliminating the back monitor 19 from the DVD laser power control system LPdvd, and a CD laser power control unit LPcd_1 configured by eliminating the front monitor 8 from the CD laser power control system LPcd, share a front monitor 8. The front monitor 8 collects either CD laser light Lc or DVD laser light Ld and generates a laser intensity signal PD0. The laser intensity signal PD0 is then supplied to the CD laser power control unit LPcd_1 and the DVD laser power control unit LPdvd_1 through the junction 11.

Note that although the laser intensity signal PD0 is generated from one front monitor 8, the laser intensity signal PD0 is essentially the same as the aforementioned laser intensity signals PD01 and PD02. Note also that in FIG. 1, due to space limitations, a reproduction amplification unit Up and a recording amplification unit Ur are collectively referred to as an "amplification unit U" and the following description also collectively refers them as the "amplification unit U", as is the case above.

Now, the operation of the controller 100a will be described. The controller 100a detects whether to use a DVD drive or a CD drive based on an operation mode signal Sm inputted from a combination drive (not shown), and generates a control signal Sca for controlling each component of the laser power control apparatus LPC1, in accordance with the drive to be used. Specifically, in the case where the CD drive is used, i.e, in the case where a laser diode LD1 emits light, an operational amplifier 6 of the DVD laser power control unit LPdvd_1 is turned off so that a laser diode LD2 will not emit light. More specifically, the output of the operational amplifier 6 is pulled up to the power supply voltage. Accordingly, only the CD laser power control system LPcd (CD laser power control unit LPcd_1) functions and thus the laser power of the laser diode LD1 is appropriately controlled.

On the other hand, in the case where the DVD drive is used, i.e., in the case where the laser diode LD2 emits light, an offset adjuster 1, a variable gain circuit 2, a sample/hold circuit 3, and an operational amplifier 4 of the CD laser power control unit LPcd_1 are turned off. Accordingly, only the DVD laser power control system LPdvd (DVD laser power control unit LPdvd_1) functions and thus the laser power of the laser diode LD2 is appropriately controlled.—

As described above, in the present embodiment, while a laser intensify signal PD0 outputted from the front monitor 8 is supplied through the junction 11 to both the CD laser power control system LPcd and the DVD laser power control system LPdvd, the laser power of only the drive to be used is appropriately controlled based on the operation mode (i.e., an operation mode signal Sm) of the combination drive.

Second Embodiment

Figure 2:
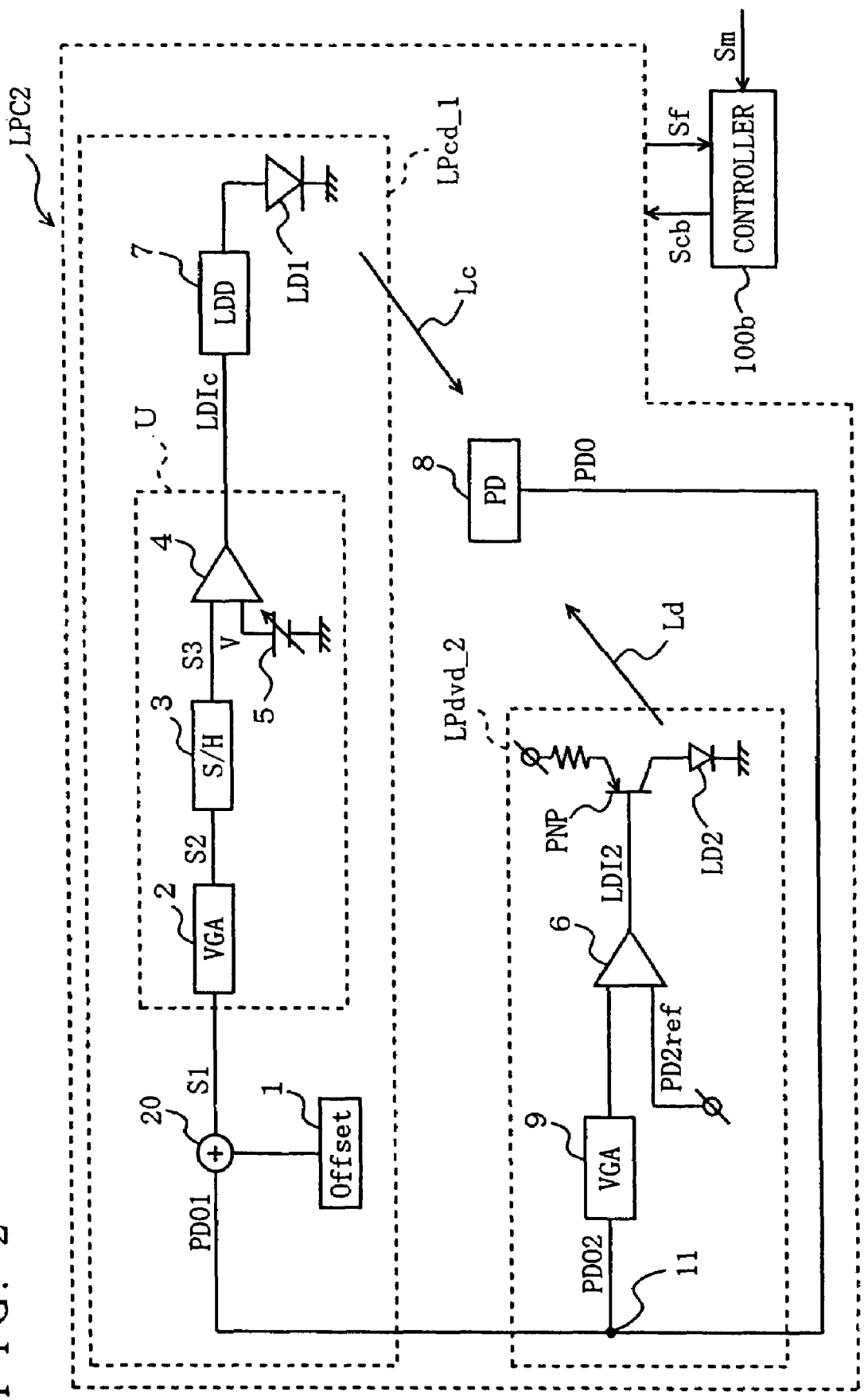
FIG. 2 is a block diagram illustrating a configuration of a laser power control apparatus according to a second embodiment of the present invention.

Referring to FIG. 2, a laser power control apparatus according to the present embodiment will be described. A laser power control apparatus LPC2 is a modified version of the laser power control apparatus LPC1 shown in FIG. 1, in which the laser power control unit LPdvd_1 is replaced with a DVD laser power control unit LPdvd_2 and the controller 100a is replaced with a controller 100b. The DVD laser power control unit LPdvd_2 is different from the DVD laser power control unit LPdvd_1 in that a variable gain circuit 9 (referred to as "VGA" in the drawing) is inserted between an operational amplifier 6 and a junction 11.

A laser intensity signal PD02 (PD0) is gain adjusted by the variable gain circuit 9 and then inputted to the operational amplifier 6. That is, in order to allow a front monitor 8, which is essentially used to detect CD laser light Lc, to detect DVD laser light Ld having different intensity characteristics, etc., from the CD laser light Lc, it is necessary to change the sensitivity (voltage gain) of the variable gain circuit 9 to the DVD laser light Ld. In terms of this, in the present embodiment, the necessity of changing the power supply gain of the front monitor 8 itself is eliminated by gain adjusting the laser intensity signal PD0 by the variable gain circuit 9. In other words, the front monitor 8 which is used for CD laser light Lc can also be used for DVD laser light Ld having a higher energy, with appropriate sensitivity, without the need to adjust the front monitor 8 itself.

Now the operation of the controller 100b will be described. As is the case with the controller 100a, the controller 100b also generates a control signal Scb based on an operation mode signal Sm and controls the laser power control apparatus LPC2. In the case where the CD drive is used, i.e., in the case where a laser diode LD1 emits light, the operational amplifier 6 and variable gain circuit 9 of the DVD laser power control unit LPdvd_2 are turned off so that a laser diode LD2 will not emit light. Accordingly, only the CD laser power control unit LPcd_1 functions and thus the laser power of the laser diode LD1 is appropriately controlled.

On the other hand, in the case where the DVD drive is used, i.e., in the case where the laser diode LD2 emits light, the controller 100b turns off the offset adjuster 1, variable gain circuit 2, sample/hold circuit 3, and operational amplifier 4 of the CD laser power control unit LPcd_1. Accordingly, only the DVD laser power control unit LPdvd_2 functions and thus the laser power of the laser diode LD2 is appropriately controlled.

Third Embodiment

Figure 3:
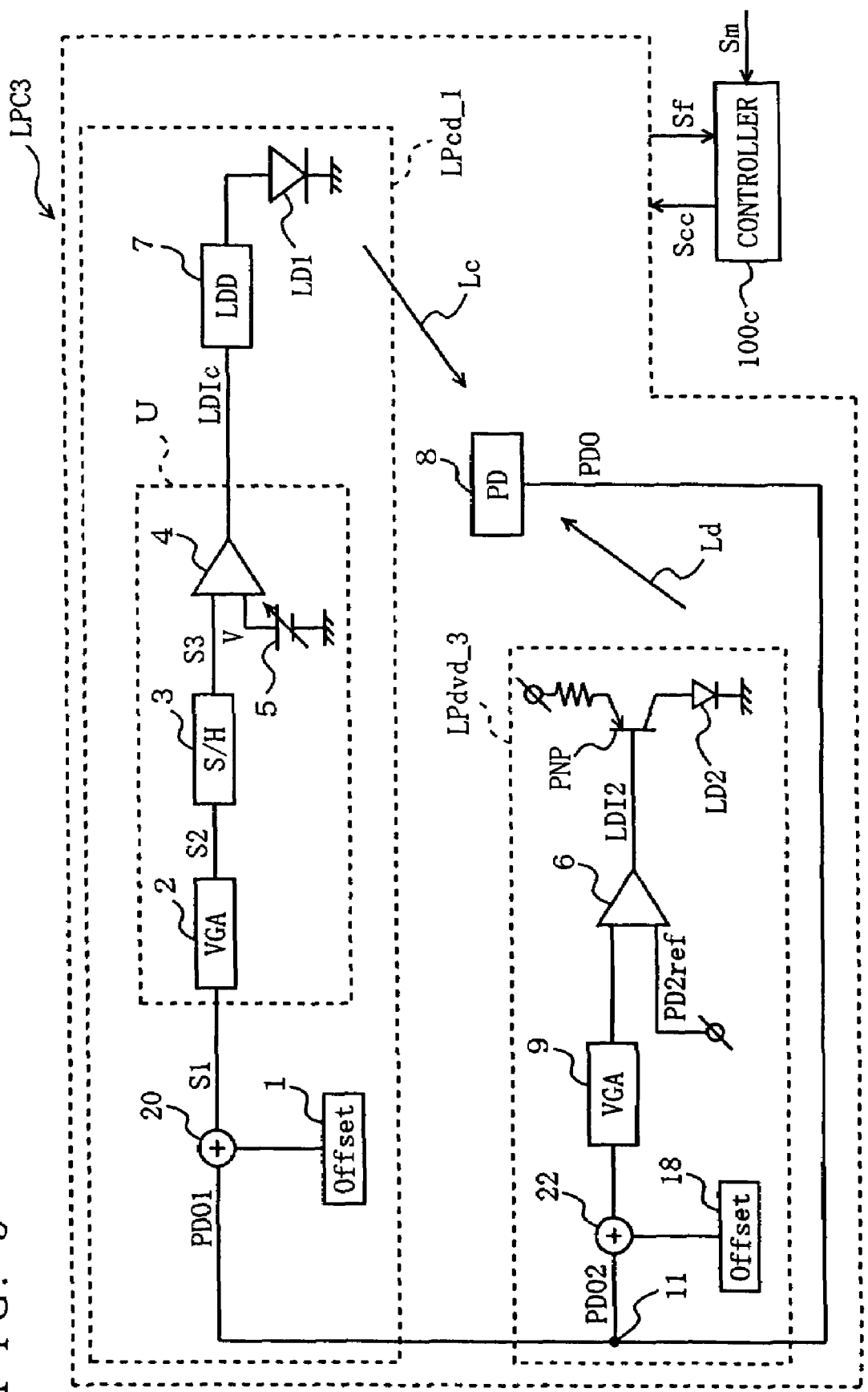
FIG. 3 is a block diagram illustrating a configuration of a laser power control apparatus according to a third embodiment of the present invention.

Referring to FIG. 3, a laser power control apparatus according to the present embodiment will be described. A laser power control apparatus LPC3 is a modified version of the laser power control apparatus LPC2 shown in FIG. 2, in which the laser power control unit LPdvd_2 is replaced with a DVD laser power control unit LPdvd_3 and the controller 100b is replaced with a controller 100c. The DVD laser power control unit LPdvd_3 is different from the DVD laser power control unit LPdvd_2 in that an offset adjuster 18 is additionally provided between a variable gain circuit 9 and a junction 11 through an adder 22.

By using the offset adjuster 18, the sensitivity to DVD laser light Ld applied from a laser diode LD2 can be more accurately adjusted than the laser power control apparatus LPC2, without the need to change the voltage gain of a front monitor 8.

Next, the operation of the controller 100c will be described. The controller 100c generates a control signal Scc based on an operation mode signal Sm and controls the laser power control apparatus LPC3. In the case where the CD drive is used, i.e., in the case where a laser diode LD1 emits light, the operational amplifier 6, variable gain circuit 9, and offset adjuster 18 of the DVD laser power control unit LPdvd_3 are turned off so that the laser diode LD2 will not emit light. Accordingly, only the CD laser power control unit LPcd_1 functions and thus the laser power of the laser diode LD1 is appropriately controlled.

On the other hand, in the case where the DVD drive is used, i.e., in the case where the laser diode LD2 emits light, the controller 100c turns off the offset adjuster 1, variable gain circuit 2, sample/hold circuit 3, and operational amplifier 4 of the CD laser power control unit LPcd_1. Accordingly, only the DVD laser power control unit LPdvd_3 functions and thus the laser power of the laser diode LD2 is appropriately controlled.

Fourth Embodiment

Figure 4:
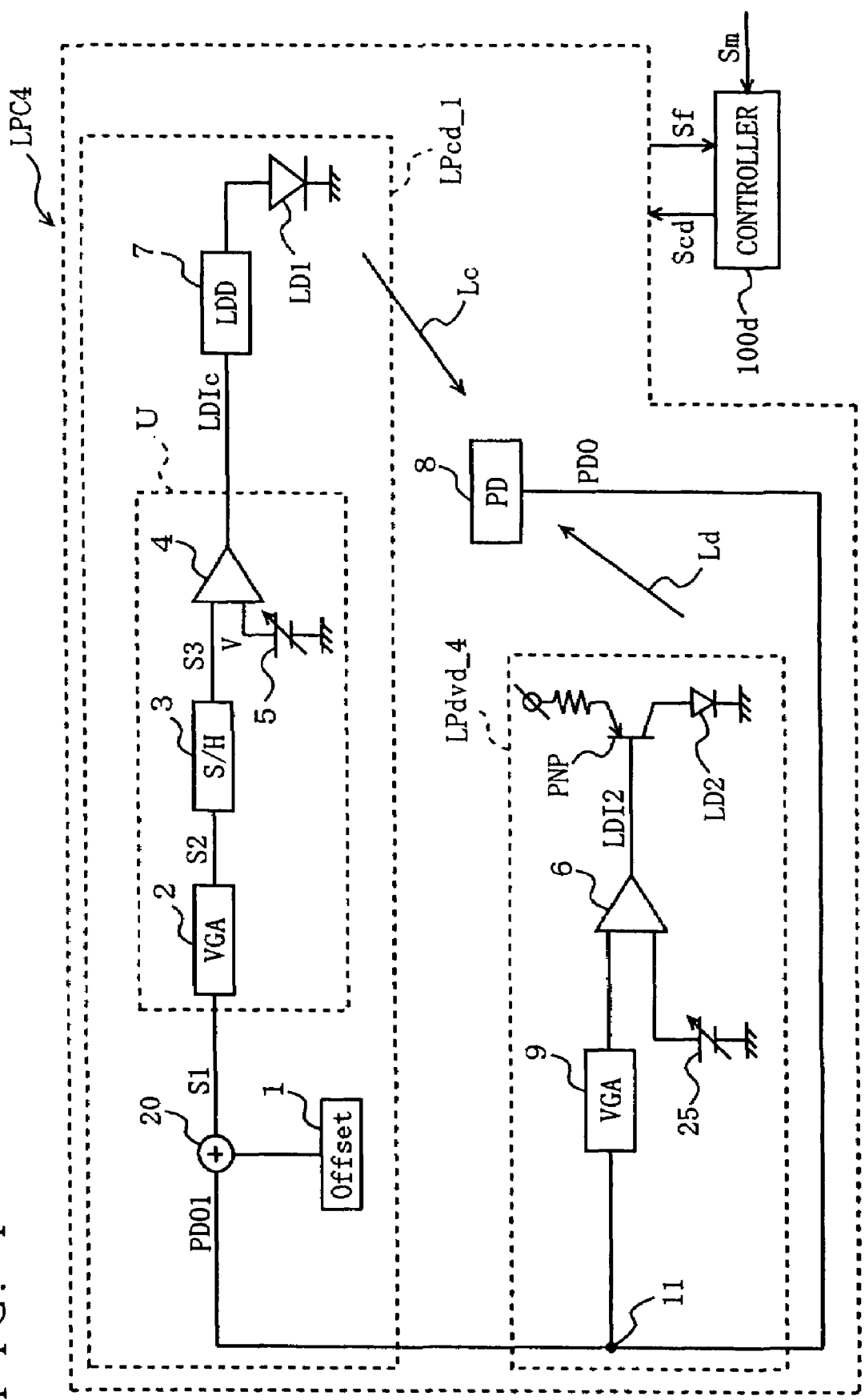
FIG. 4 is a block diagram illustrating a configuration of a laser power control apparatus according to a fourth embodiment of the present invention.

Referring to FIG. 4, a laser power control apparatus according to the present embodiment will be described. A laser power control apparatus LPC4 is a modified version of the laser power control apparatus LPC2 shown in FIG. 2, in which the laser power control unit LPdvd_2 is replaced with a DVD laser power control unit LPdvd_4 and the controller 100b is replaced with a controller 100d. In the DVD laser power control unit LPdvd_4, instead of the reference potential PD2ref, a variable voltage source 25 is connected to an operational amplifier 6. By using the variable voltage source 25, a given voltage within a predetermined range can be set as a reference potential, and therefore the sensitivity to DVD laser light Ld can be more accurately adjusted than the laser power control apparatus LPC2.

Next, the operation of the controller 100d will be described. The controller 100d generates a control signal Scd based on an operation mode signal Sm and controls the laser power control apparatus LPC4. Specifically, in the case where the CD drive is used, the operational amplifier 6 and variable gain circuit 9 of the DVD laser power control unit LPdvd_4 are turned off so that a laser diode LD2 will not emit light.

Accordingly, only the CD laser power control unit LPcd_1 functions and thus the laser power of a laser diode LD1 is appropriately controlled.

On the other hand, in the case where the DVD drive is used, the controller 100d turns off the offset adjuster 1, variable gain circuit 2, sample/hold circuit 3, and operational amplifier 4 of the CD laser power control unit LPcd_1. Accordingly, only the DVD laser power control unit LPdvd_4 functions and thus the laser power of the laser diode LD2 is appropriately controlled.

Fifth Embodiment

Figure 5:
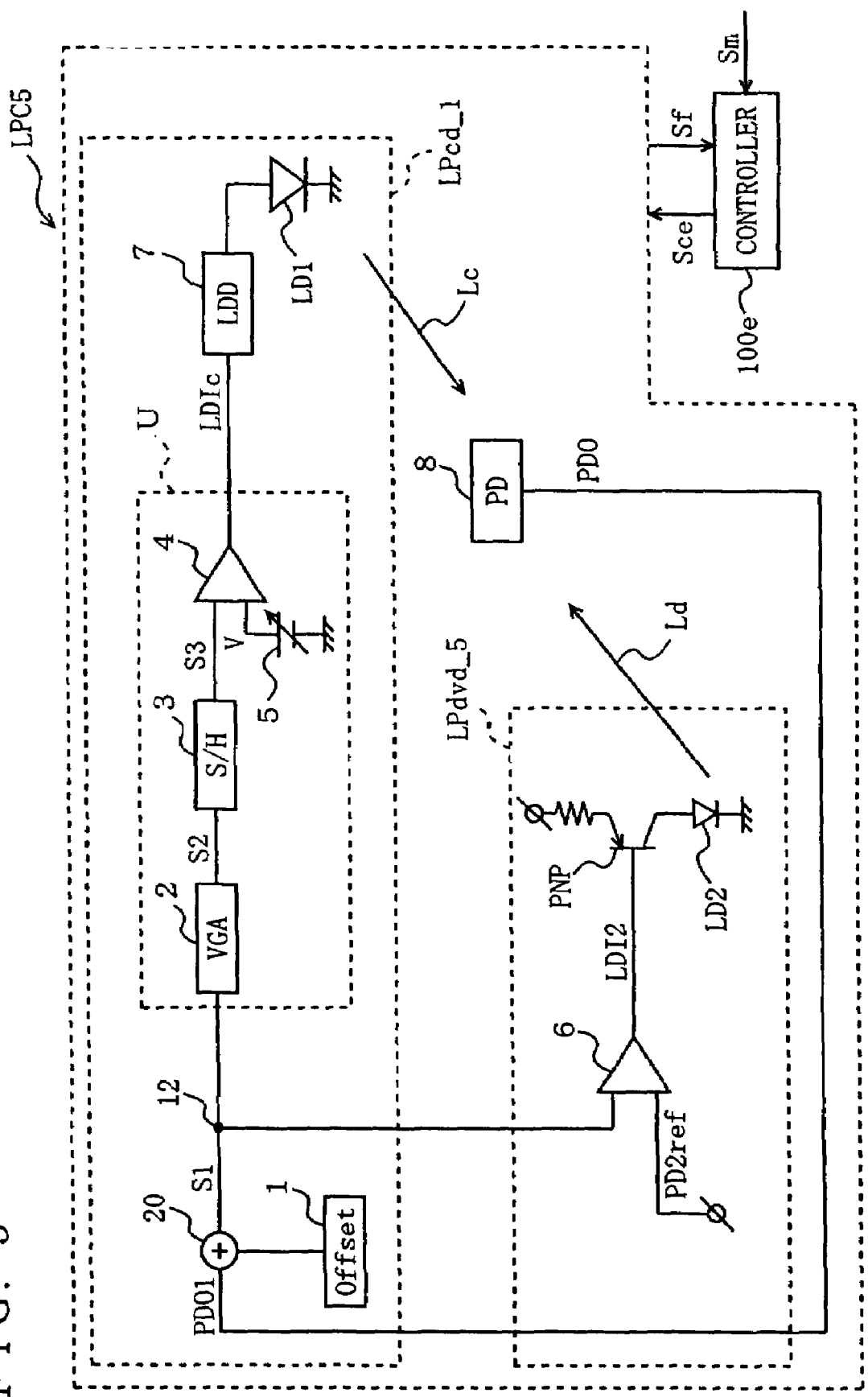
FIG. 5 is a block diagram illustrating a configuration of a laser power control apparatus according to a fifth embodiment of the present invention.

Referring to FIG. 5, a laser power control apparatus according to the present embodiment will be described. A laser power control apparatus LPC5 is a modified version of the laser power control apparatus LPC1 shown in FIG. 1, in which the laser power control unit LPdvd_1 is replaced with a DVD laser power control unit LPdvd_5 and the controller 100a is replaced with a controller 100e. In the DVD laser power control unit LPdvd_5, an operational amplifier 6 is connected between the adder 20 and amplification unit U of the CD laser power control unit LPcd_1 through a junction 12 instead of the junction 11.

A laser intensity signal PD0 (PD01) which is an output from a front monitor 8 is offset adjusted by an offset adjuster 1 and then inputted to the operational amplifier 6. That is, the laser power control apparatus LPC5 has an effect of accommodating the difference in the light emission levels of two different types of lasers, as does the aforementioned sample/hold circuit 3 of the laser power control apparatus LPC1. In the present embodiment, by sharing the offset adjuster 1 with the CD laser power control unit LPcd_1 and the DVD laser power control unit LPdvd_5, the laser power control apparatus LPC5 can be reduced in circuit size compared to the laser power control apparatus LPC3.

Next, the operation of the controller 100e will be described. The controller 100e generates a control signal Sce based on an operation mode signal Sm and controls the laser power control apparatus LPC5. Specifically, in the case where the CD drive is used, the operational amplifier 6 of the DVD laser power control unit LPdvd_5 is turned off so that a laser diode LD2 will not emit light. Accordingly, only the CD laser power control unit LPcd_1 functions and thus the laser power of the laser diode LD1 is appropriately controlled.

On the other hand, in the case where the DVD drive is used, the controller 100e turns off the variable gain circuit 2, sample/hold circuit 3, and operational amplifier 4 of the CD laser power control unit LPcd_1. Note that the offset value of the offset adjuster 1 is changed to a value appropriate for the laser diode LD2. That is, in the present embodiment, the controller 100e changes the offset value of the offset adjuster 1 between at least two types, i.e., CD and DVD applications.

Sixth Embodiment

Figure 6:
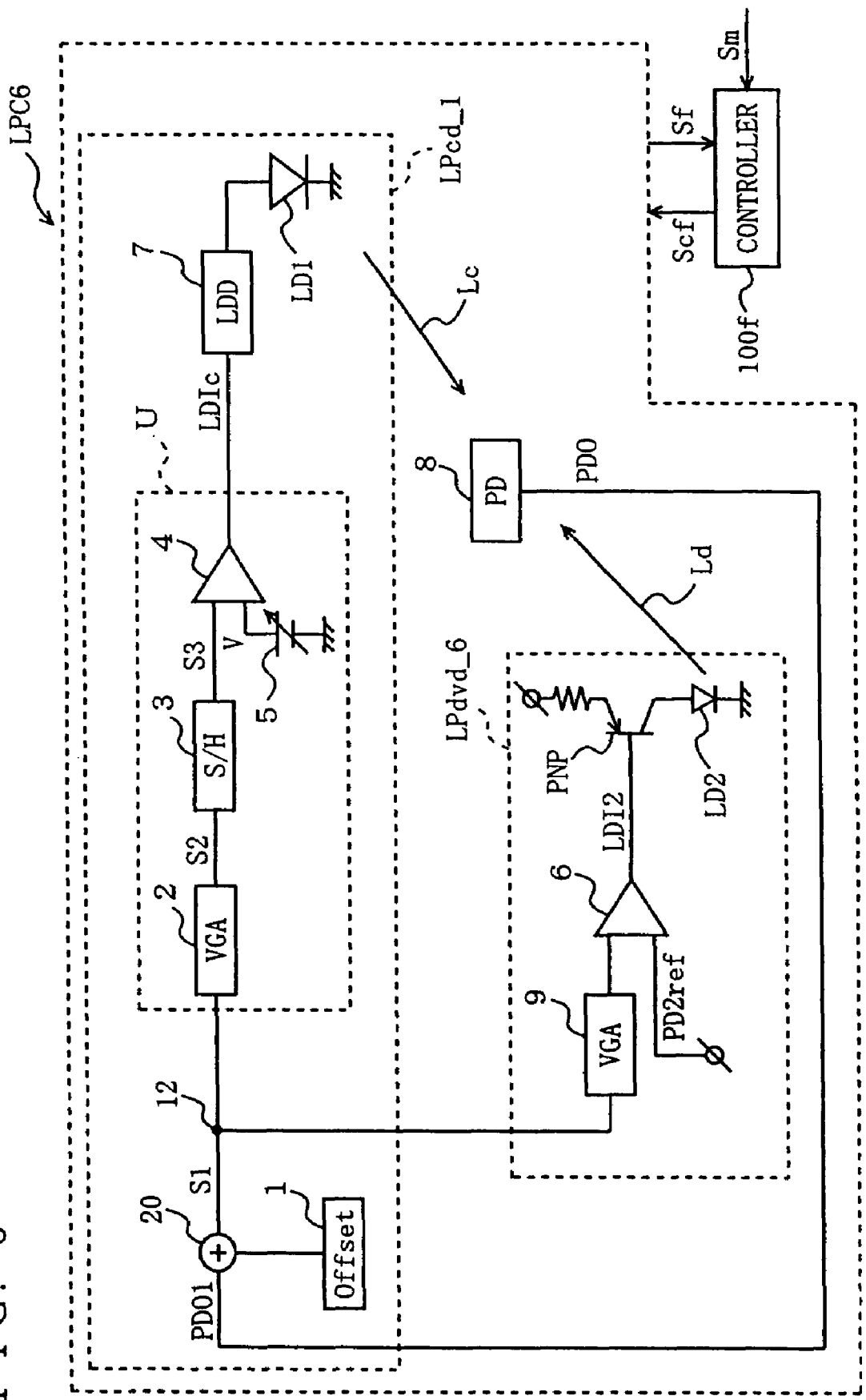
FIG. 6 is a block diagram illustrating a configuration of a laser power control apparatus according to a sixth embodiment of the present invention.

Referring to FIG. 6, a laser power control apparatus according to the present embodiment will be described. A laser power control apparatus LPC6 is a modified version of the laser power control apparatus LPC5 shown in FIG. 5, in which the laser power control unit LPdvd_5 is replaced with a DVD laser power control unit LPdvd_6 and the controller 100e is replaced with a controller 100f. In the DVD laser power control unit LPdvd_6, a variable gain circuit 9 is additionally provided between an operational amplifier 6 and a junction 12.

A laser intensity signal PD0 (PD01) outputted from the front monitor 8 is offset adjusted by an adder 20 and an offset adjuster 1, then further gain adjusted by the variable gain circuit 9, and then inputted to the operational amplifier 6. This configuration provides the same advantageous effect as that obtained by the laser power control apparatus LPC3 shown in FIG. 3. In addition, by sharing the offset adjuster 1 and the adder 20 with the CD laser power control unit LPcd_1 and the DVD laser power control unit LPdvd_6, the laser power control apparatus LPC6 can be reduced in circuit size compared to the laser power control apparatus LPC3.

Next, the operation of the controller 100f will be described. The controller 100f generates a control signal Scf based on an operation mode signal Sm and controls the laser power control apparatus LPC6. Specifically, in the case where the CD drive is used, the operational amplifier 6 and variable gain circuit 9 of the DVD laser power control unit LPdvd_6 are turned off so that a laser diode LD2 will not emit light. Accordingly, only the CD laser power control unit LPcd_1 functions and thus the laser power of a laser diode LD1 is appropriately controlled.

On the other hand, in the case where the DVD drive is used, the controller 100f turns off the variable gain circuit 2, sample/hold circuit 3, and operational amplifier 4 of the CD laser power control unit LPcd_1. Note that the offset value of the offset adjuster 1 is changed to a value appropriate for the laser diode LD2. The variable gain circuits 2 and 9 have fixed gain values.

Seventh Embodiment

Figure 7:
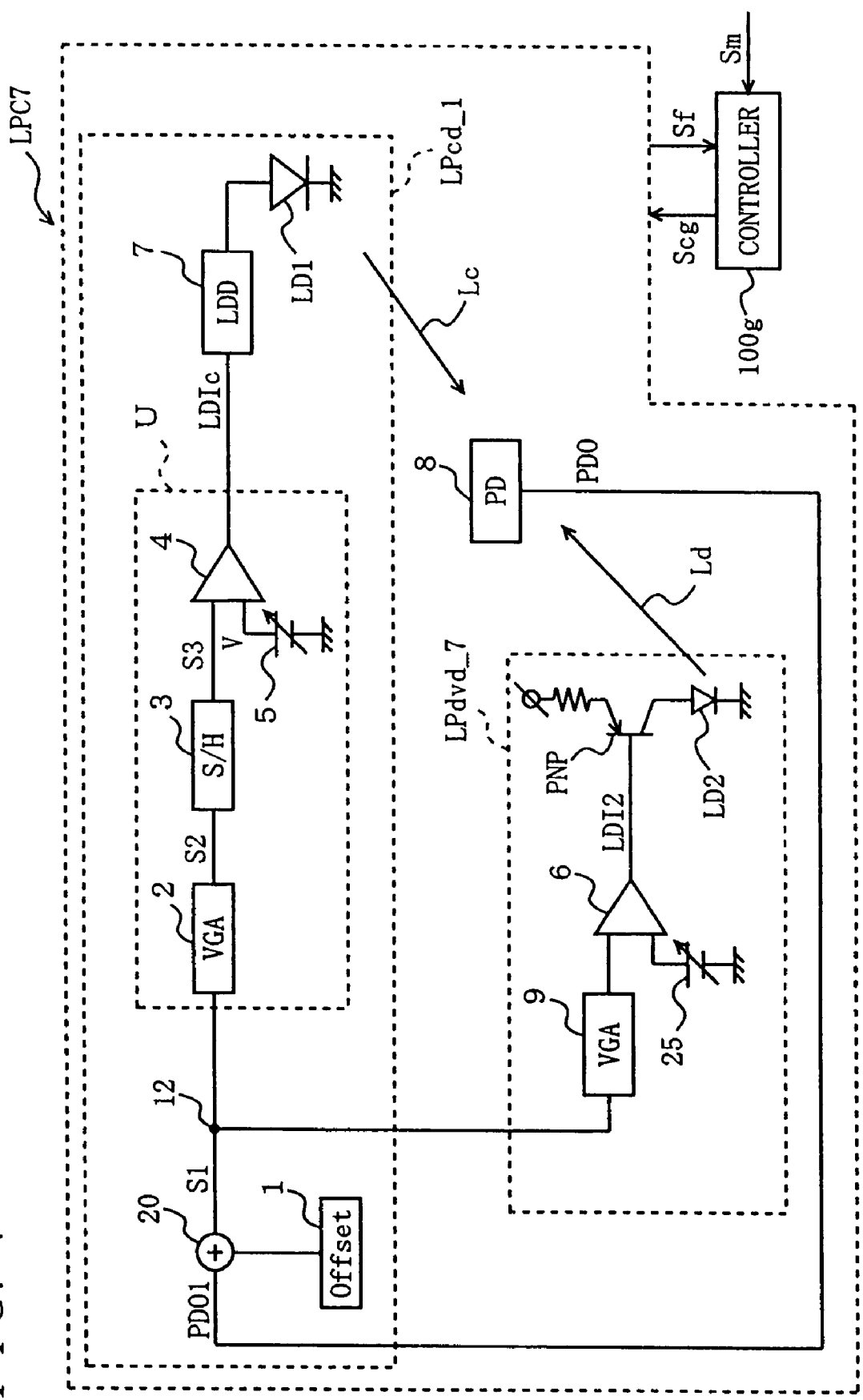
FIG. 7 is a block diagram illustrating a configuration of a laser power control apparatus according to a seventh embodiment of the present invention.

Referring to FIG. 7, a laser power control apparatus according to the present embodiment will be described. A laser power control apparatus LPC7 is a modified version of the laser power control apparatus LPC6 shown in FIG. 6, in which the laser power control unit LPdvd_6 is replaced with a DVD laser power control unit LPdvd_7 and the controller 100f is replaced with a controller 100g. In the DVD laser power control unit LPdvd_7, the reference potential PD2ref of the operational amplifier 6 is replaced with a variable voltage source 25. By this, the reference potential can be set to a given value within a predetermined range, and therefore the amplification characteristics provided by the operational amplifier 6 can be more minutely adjusted than the case of the laser power control apparatus LPC6.

Next, the operation of the controller 100g will be described. The controller 100g generates a control signal Scg based on an operation mode signal Sm and controls the laser power control apparatus LPC7. Specifically, in the case where the CD drive is used, the operational amplifier 6 and variable gain circuit 9 of the DVD laser power control unit LPdvd_7 are turned off so that a laser diode LD2 will not emit light. Accordingly, only the CD laser power control unit LPcd_1 functions and thus the laser power of a laser diode LD1 is appropriately controlled.

On the other hand, in the case where the DVD drive is used, the controller 100g turns off the variable gain circuit 2, sample/hold circuit 3, and operational amplifier 4 of the CD laser power control unit LPcd_1. Note that the offset value of an offset adjuster 1 is changed to a value appropriate for the laser diode LD2. The variable gain circuits 2 and 9 have fixed gain values. The voltage values of the variable voltage sources 5 and 25 are fixed to predetermined values.

Eighth Embodiment

Figure 8:
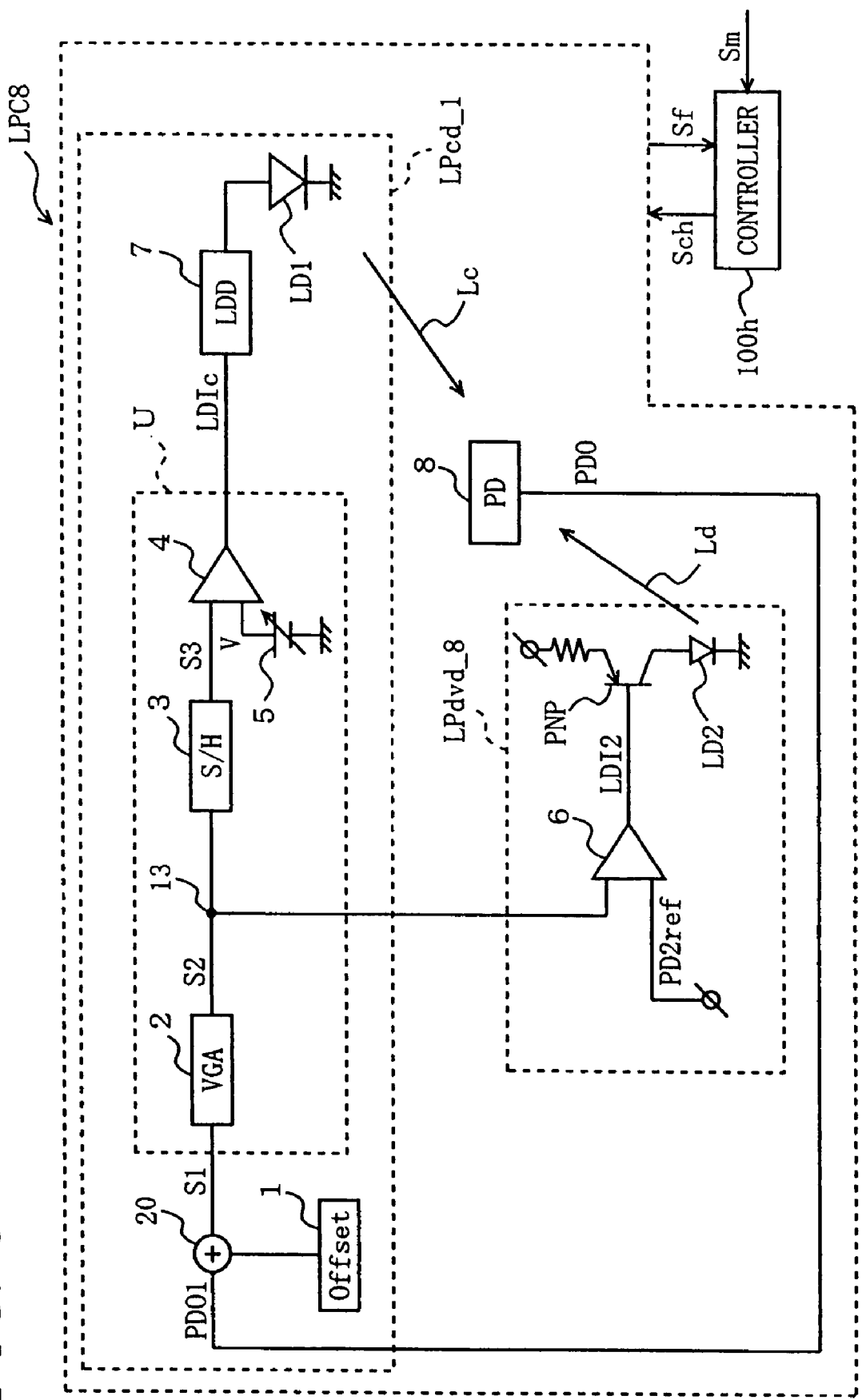
FIG. 8 is a block diagram illustrating a configuration of a laser power control apparatus according to an eighth embodiment of the present invention.

Referring to FIG. 8, a laser power control apparatus according to the present embodiment will be described. A laser power control apparatus LPC8 is a modified version of the laser power control apparatus LPC1 shown in FIG. 1, in which the laser power control unit LPdvd_1 is replaced with a DVD laser power control unit LPdvd_8 and the controller 100a is replaced with a controller 100h. In the DVD laser power control unit LPdvd_8, a laser intensity signal S2, which is an output from a variable gain circuit 2 of a CD laser power control unit LPcd_1, is inputted to an operational amplifier 6 of the DVD laser power control unit LPdvd_8 through a junction 13. That is, this configuration is such that in the laser power control apparatus LPC3 shown in FIG. 3 the variable gain circuit 9, offset adjuster 18, and adder 22 of the DVD laser power control unit LPdvd_3 are eliminated and the functions of the eliminated components are performed by the offset adjuster 1, variable gain circuit 2, and adder 20 of the CD laser power control unit LPcd_1. With this configuration, the laser power control apparatus LPC8 can be reduced in circuit size compared to the laser power control apparatus LPC3.

Next, the operation of the controller 100h will be described. The controller 100h generates a control signal Sch based on an operation mode signal Sm and controls the laser power control apparatus LPC8. Specifically, in the case where the CD drive is used, the operational amplifier 6 of the DVD laser power control unit LPdvd_8 is turned off so that a laser diode LD2 will not emit light. Accordingly, only the CD laser power control unit LPcd_1 functions and thus the laser power of a laser diode LD1 is appropriately controlled.

On the other hand, in the case where the DVD drive is used, the controller 100h turns off the variable gain circuit 2, sample/hold circuit 3, and operational amplifier 4 of the CD laser power control unit LPcd_1. Note that the offset value of the offset adjuster 1 and the gain value of the variable gain circuit 2 are changed to values appropriate for the laser diode LD2.

Ninth Embodiment

Figure 9:
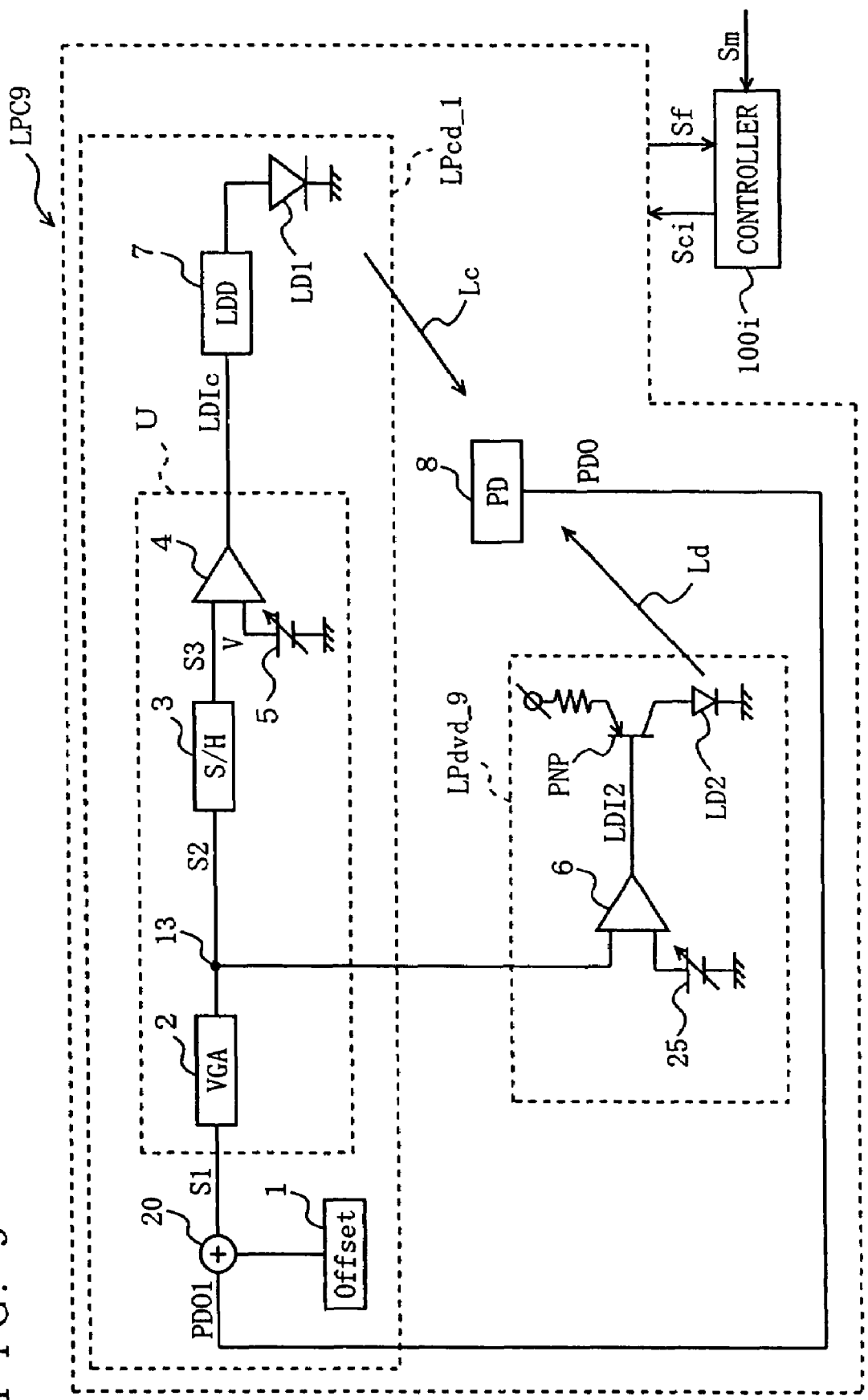
FIG. 9 is a block diagram illustrating a configuration of a laser power control apparatus according to a ninth embodiment of the present invention.

Referring to FIG. 9, a laser power control apparatus according to the present embodiment will be described. A laser power control apparatus LPC9 is a modified version of the laser power control apparatus LPC8 shown in FIG. 8, in which the laser power control unit LPdvd_8 is replaced with a DVD laser power control unit LPdvd_9 and the controller 100h is replaced with a controller 100i. In the DVD laser power control unit LPdvd_9, the reference potential PD2ref of the operational amplifier 6 is replaced with a variable voltage source 25. By this, the reference potential can be set to an appropriate value within a predetermined range, and therefore the amplification provided by the operational amplifier 6 can be more minutely adjusted than the case of the laser power control apparatus LPC8.

Next, the operation of the controller 100i will be described. The controller 100i generates a control signal Sci based on an operation mode signal Sm and controls the laser power control apparatus LPC9. Specifically, in the case where the CD drive is used, the operational amplifier 6 of the DVD laser power control unit LPdvd_9 is turned off so that a laser diode LD2 will not emit light. Accordingly, only the CD laser power control unit LPcd_1 functions and thus the laser power of a laser diode LD1 is appropriately controlled.

On the other hand, in the case where the DVD drive is used, the controller 100i turns off the sample/hold circuit 3 and operational amplifier 4 of the CD laser power control unit LPcd_1. Then, the offset value of an offset adjuster 1 and the gain value of a variable gain circuit 2 are changed to values appropriate for the laser diodes LD1 and LD2. The values of the variable voltage sources 5 and 25 are fixed to predetermined values.

Tenth Embodiment

Figure 10:
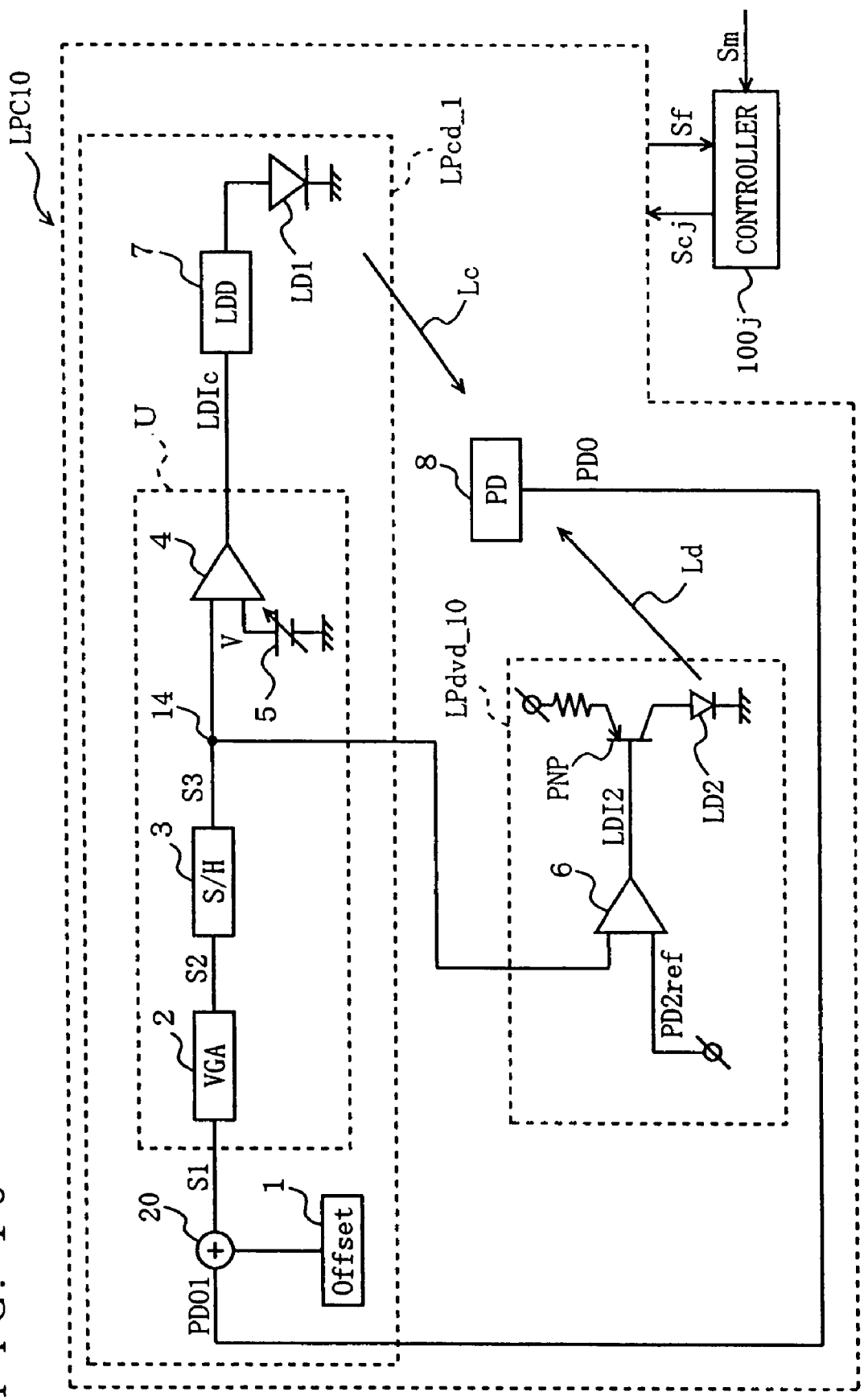
FIG. 10 is a block diagram illustrating a configuration of a laser power control apparatus according to a tenth embodiment of the present invention.

Referring to FIG. 10, a laser power control apparatus according to the present embodiment will be described. A laser power control apparatus LPC10 is a modified version of the laser power control apparatus LPC8 shown in FIG. 8, in which the laser power control unit LPdvd_8 is replaced with a DVD laser power control unit LPdvd_10 and the controller 100h is replaced with a controller 100j. In the DVD laser power control unit LPdvd_10, a laser intensity signal S3, which is an output from a sample/hold circuit 3 of a CD laser power control unit LPcd_1, is inputted to an operational amplifier 6 of the DVD laser power control unit LPdvd_10 through a junction 14. By this, it is possible to input to the operational amplifier 6 a laser intensity signal S3 from which high-frequency noise has been eliminated by a filter provided in the sample/hold circuit 3.

Next, the operation of the controller 100j will be described. The controller 100j generates a control signal Scj based on an operation mode signal Sm and controls the laser power control apparatus LPC10. Specifically, in the case where the CD drive is used, the operational amplifier 6 of the DVD laser power control unit LPdvd_10 is turned off so that a laser diode LD2 will not emit light. Accordingly, only the CD laser power control unit LPcd_1 functions and thus the laser power of a laser diode LD1 is appropriately controlled.

On the other hand, in the case where the DVD drive is used, the controller 100j turns off an operational amplifier 4 of the CD laser power control unit LPcd_1, while allowing the sample/hold circuit 3 to operate at all times. Note that the offset value of an offset adjuster 1 and the gain value of a variable gain circuit 2 are changed to values appropriate for the laser diodes LD1 and LD2.

Eleventh Embodiment

Figure 11:
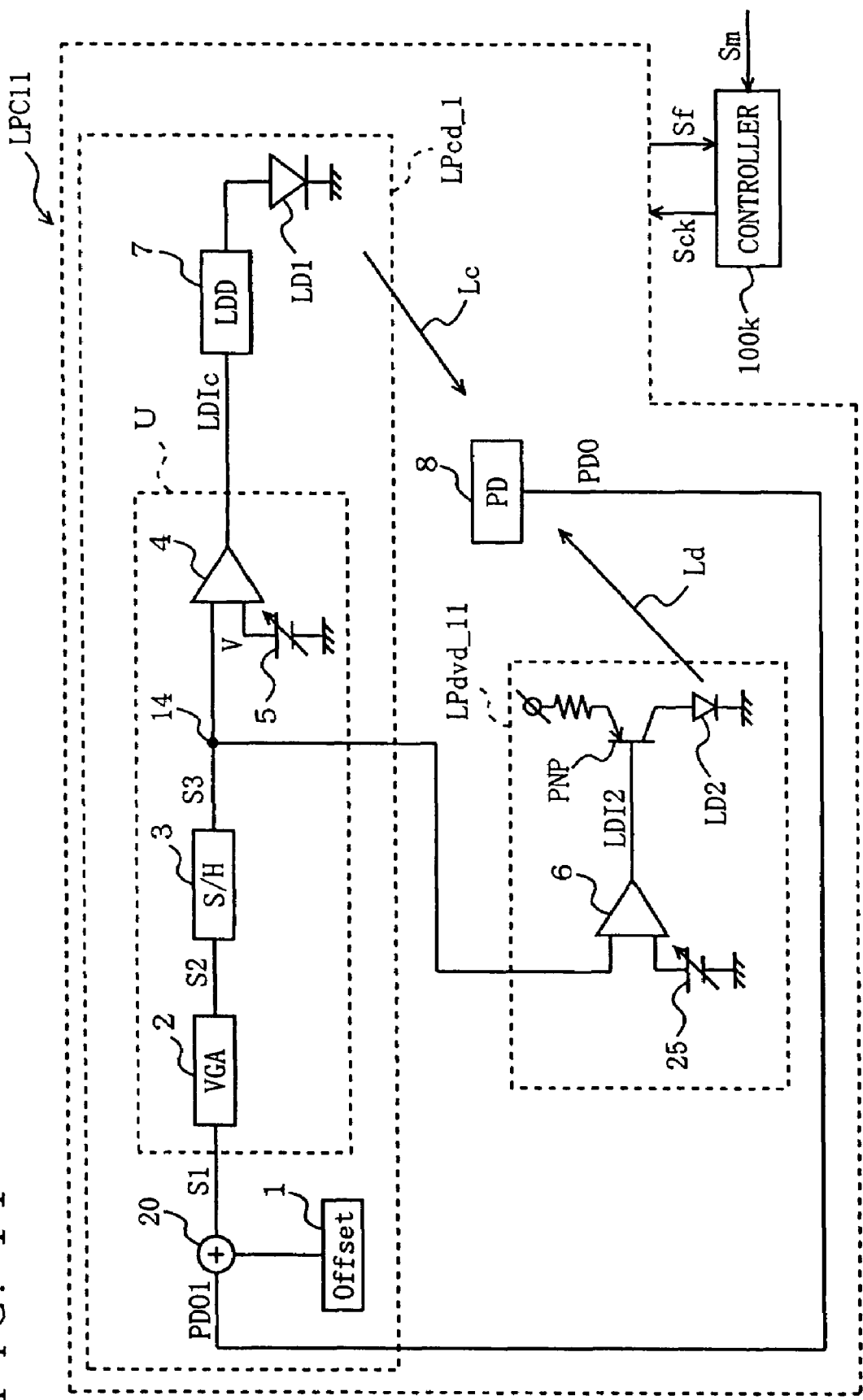
FIG. 11 is a block diagram illustrating a configuration of a laser power control apparatus according to an eleventh embodiment of the present invention.

Referring to FIG. 11, a laser power control apparatus according to the present embodiment will be described. A laser power control apparatus LPC11 is a modified version of the laser power control apparatus LPC10 shown in FIG. 10, in which the laser power control unit LPdvd_10 is replaced with a DVD laser power control unit LPdvd_11 and the controller 100j is replaced with a controller 100k. In the DVD laser power control unit LPdvd_11, the reference potential PD2ref of the operational amplifier 6 is replaced with a variable voltage source 25. By this, the reference potential can be set to an appropriate value within a predetermined range, and therefore the amplification characteristics provided by the operational amplifier 6 can be more minutely adjusted than the case of the laser power control apparatus LPC10.

Next, the operation of the controller 100k will be described. The controller 100k generates a control signal Sck based on an operation mode signal Sm and controls the laser power control apparatus LPC11. Specifically, in the case where the CD drive is used, the operational amplifier 6 of the DVD laser power control unit LPdvd_11 is turned off so that a laser diode LD2 will not emit light. Accordingly, only the CD laser power control unit LPcd_1 functions and thus the laser power of a laser diode LD1 is appropriately controlled.

On the other hand, in the case where the DVD drive is used, the controller 100k turns off an operational amplifier 4 of the CD laser power control unit LPcd_1, while allowing a sample/hold circuit 3 to operate at all times. Note that the offset value of an offset adjuster 1 and the gain value of a variable gain circuit 2 are changed to values appropriate for the laser diodes LD1 and LD2. The values of variable voltage sources 5 and 25 are fixed to predetermined values.

Twelfth Embodiment

Figure 12:
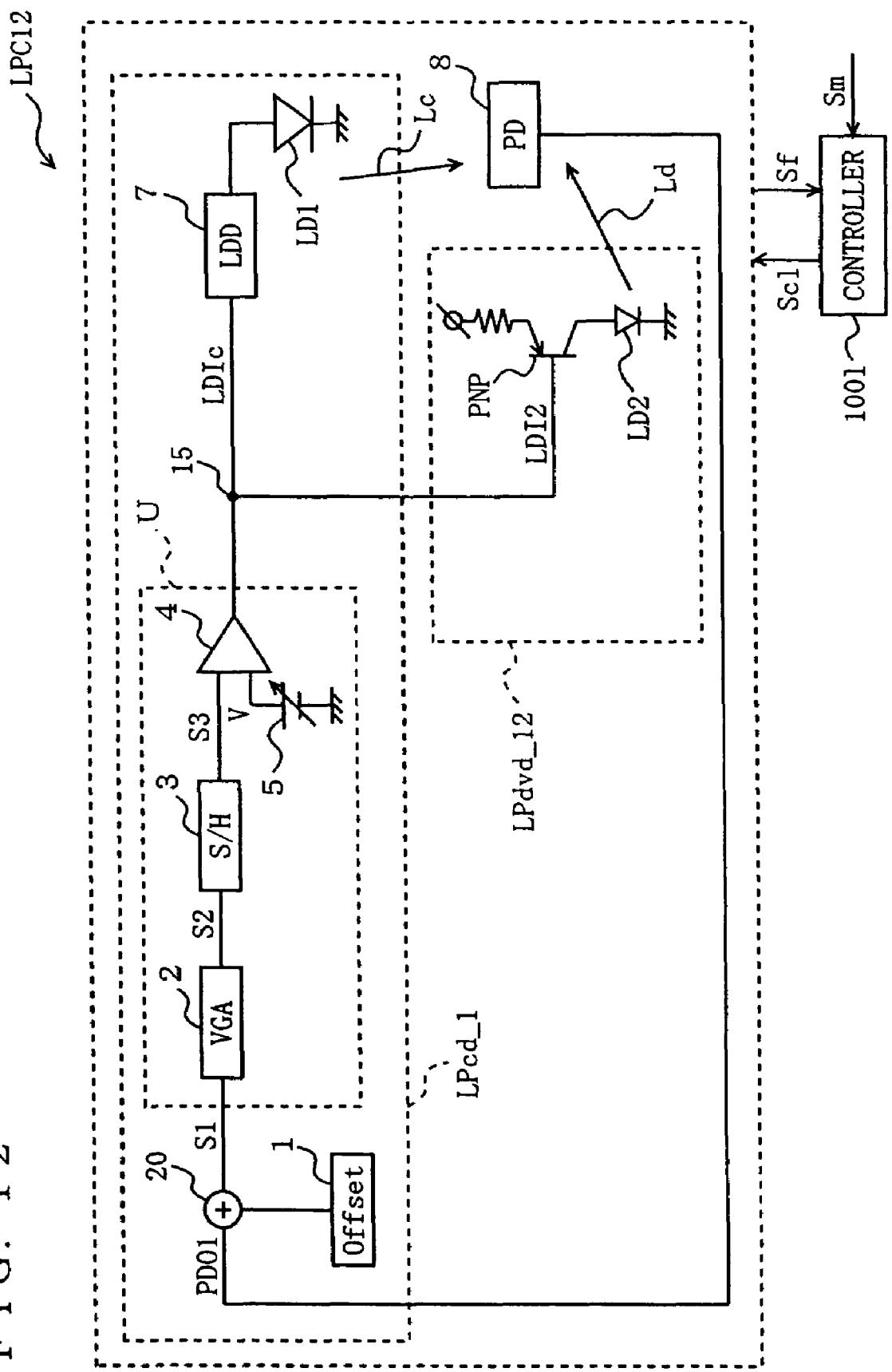
FIG. 12 is a block diagram illustrating a configuration of a laser power control apparatus according to a twelfth embodiment of the present invention.

Referring to FIG. 12, a laser power control apparatus according to the present embodiment will be described. A laser power control apparatus LPC12 is a modified version of the laser power control apparatus LPC11 shown in FIG. 11, in which the laser power control unit LPdvd_11 is replaced with a DVD laser power control unit LPdvd_12 and the controller 100k is replaced with a controller 100l. In the DVD laser power control unit LPdvd_12, the operational amplifier 6 and the variable voltage source 25 are eliminated from the DVD laser power control unit LPdvd_11. Further, a CD laser drive control signal LDIc, which is outputted from an amplification unit U of a CD laser power control unit LPcd_1, is inputted to a transistor PNP.

That is, all the amplification functions of the drive current of a laser diode LD2 are performed by the amplification unit U of the CD laser power control unit LPcd_1, whereby the circuit size of a variable gain circuit 2 of the laser power control apparatus LPC12 can be reduced. Note that the DVD laser power control unit LPdvd_12, which only includes the transistor PNP, can control the power of DVD laser light Ld of the laser diode LD2, based on a CD laser drive control signal LDIc.

Next, the operation of the controller 100l will be described. The controller 100l generates a control signal Scl based on an operation mode signal Sm and controls the laser power control apparatus LPC12. Specifically, in the case where the CD drive is used, the transistor PNP is turned off and stopped so that the laser diode LD2 will not emit light. Accordingly, only the CD laser power control unit LPcd_1 functions and thus the laser power of a laser diode LD1 is appropriately controlled.

On the other hand, in the case where the DVD drive is used, the controller 100l turns off a laser drive circuit 7 of the CD laser power control unit LPcd_1, while allowing a sample/hold circuit 3 to operate at all times. Note that the offset value of an offset adjuster 1 and the gain value of the variable gain circuit 2 are changed to values appropriate for the laser diodes LD1 and LD2. The values of a variable voltage source 5 and the variable gain circuit 2 are fixed to predetermined values.

Thirteenth Embodiment

Figure 13:
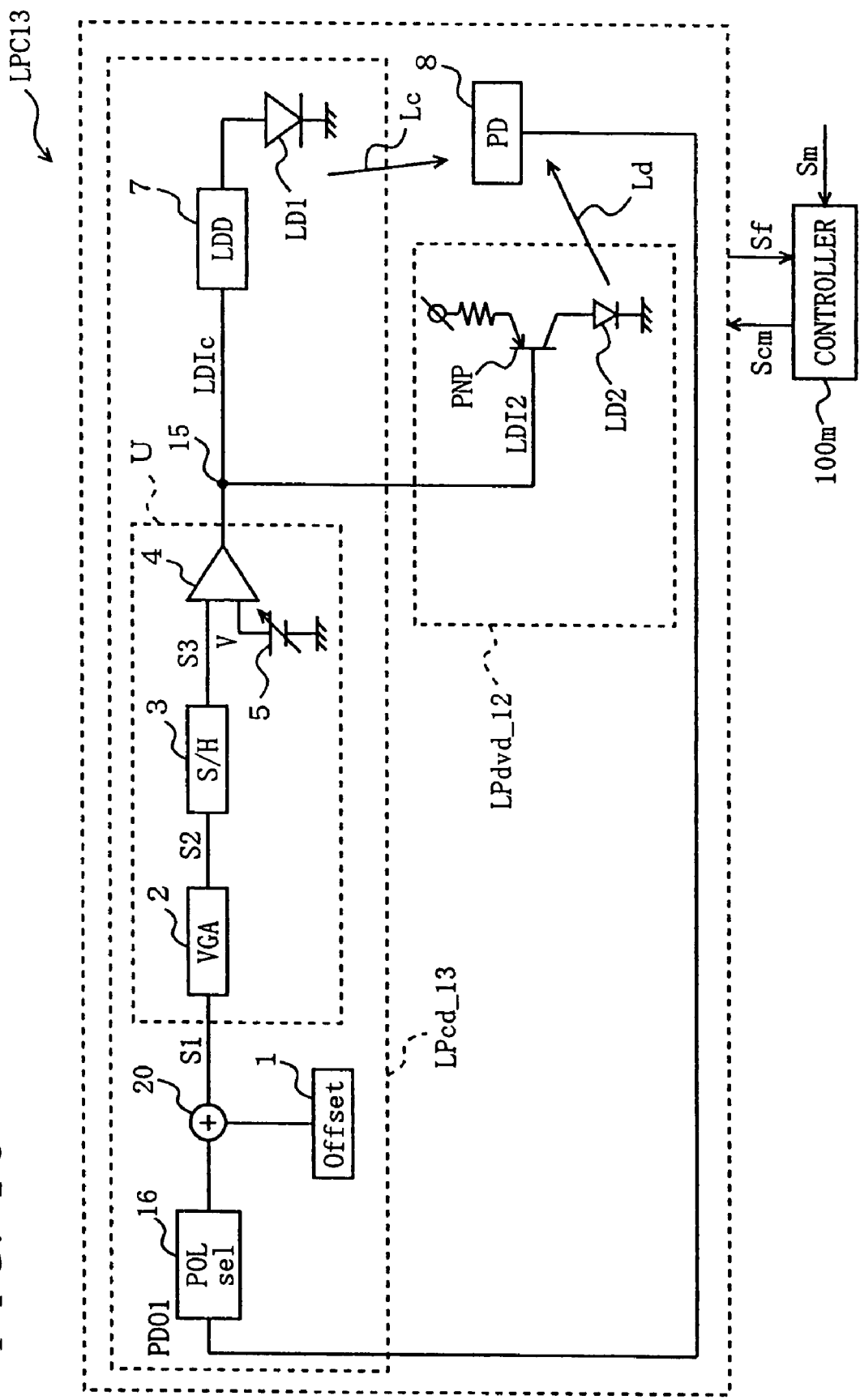
FIG. 13 is a block diagram illustrating a configuration of a laser power control apparatus according to a thirteenth embodiment of the present invention.

Referring to FIG. 13, a laser power control apparatus according to the present embodiment will be described. A laser power control apparatus LPC13 is a modified version of the laser power control apparatus LPC12 shown in FIG. 12, in which the CD laser power control unit LPcd_1 is replaced with a CD laser power control unit LPcd_13 and the controller 100l is replaced with a controller 100m. In the CD laser power control unit LPcd_13, a polarity reverser 16 (referred to as "POL sel" in the drawing) is additionally provided between an adder 20 and a front monitor 8. In other words, it can be said that the polarity reverser 16 is inserted between the CD laser power control unit LPcd_13 and the front monitor 8.

The polarity reverser 16 has the function of reversing the polarity of a signal to be inputted, in response to an instruction from the controller 100m, and outputting the signal. Specifically, a laser intensity signal PD0 (PD01) outputted from the front monitor 8 undergoes a polarity reversal, if necessary, and then is inputted to the CD laser power control unit LPcd_13. More specifically, in the case where the CD laser power control unit LPcd_13 and a DVD laser power control unit LPdvd_12 have different control polarities, the polarity of the laser intensity signal PD0 is reversed depending on the diode to be driven (i.e., either a laser diode LD1 or a laser diode LD2).

Next, the operation of the controller 100m will be described. The controller 100m generates a control signal Scm based on an operation mode signal Sm and controls the laser power control apparatus LPC13. Specifically, in the case where the CD drive is used, a transistor PNP is turned off and stopped so that the laser diode LD2 will not emit light. Accordingly, only the CD laser power control unit LPcd_13 functions and thus the laser power of the laser diode LD1 is appropriately controlled.

On the other hand, in the case where the DVD drive is used, the controller 100m turns off a laser drive circuit 7 of the CD laser power control unit LPcd_13, while allowing a sample/hold circuit 3 to operate at all times. Note that the offset value of an offset adjuster 1 and the gain value of a variable gain circuit 2 are changed to values appropriate for the laser diodes LD1 and LD2. The values of a variable voltage source 5 and the variable gain circuit 2 are fixed to predetermined values. In the case where the CD laser power control unit LPcd_13 and the DVD laser power control unit LPdvd_12 have different control polarities, the polarity of a laser intensity signal PD0 (PD01) is reversed by the polarity reverser 16, depending on the diode to be driven (i.e., either the laser diode LD1 or the laser diode LD2).

Fourteenth Embodiment

Figure 14:
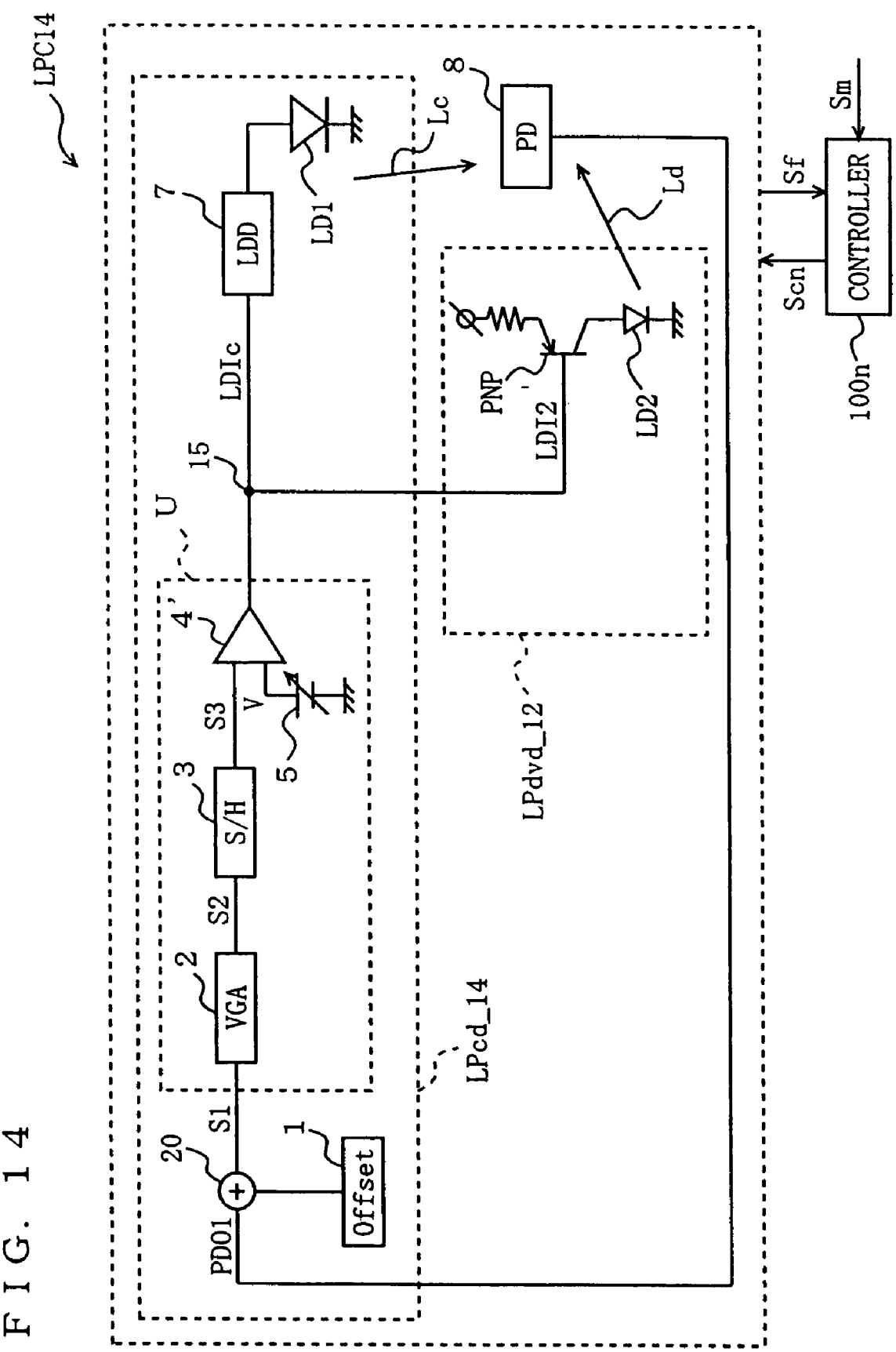
FIG. 14 is a block diagram illustrating a configuration of a laser power control apparatus according to a fourteenth embodiment of the present invention.

Referring to FIG. 14, a laser power control apparatus according to the present embodiment will be described. A laser power control apparatus LPC14 is a modified version of the laser power control apparatus LPC12 shown in FIG. 12, in which the CD laser power control unit LPcd_1 is replaced with a CD laser power control unit LPcd_14 and the controller 100l is replaced with a controller 100n. In the CD laser power control unit LPcd_14, the operational amplifier 4 is replaced with a polarity-reversible operational amplifier 4'. With this configuration, in the case where the CD laser power control unit LPcd_14 and a DVD laser power control unit LPdvd_12 have different control polarities, as with the laser power control apparatus LPC13, the polarity of the polarity-reversible operational amplifier 4' is reversed depending on the diode to be driven (i.e., either a laser diode LD1 or a laser diode LD2).

Next, the operation of the controller 100n will be described. The controller 100n generates a control signal Scn based on an operation mode signal Sm and controls the laser power control apparatus LPC14. Specifically, in the case where the CD drive is used, a transistor PNP is turned off and stopped so that the laser diode LD2 will not emit light. Accordingly, only the CD laser power control unit LPcd_14 functions and thus the laser power of the laser diode LD1 is appropriately controlled.

On the other hand, in the case where the DVD drive is used, the controller 100n turns off a laser drive circuit 7 of the CD laser power control unit LPcd_14, while allowing a sample/hold circuit 3 to operate at all times. Note that the offset value of an offset adjuster 1 and the gain value of a variable gain circuit 2 are changed to values appropriate for the laser diodes LD1 and LD2. The values of a variable voltage source 5 and the variable gain circuit 2 are fixed to predetermined values. In the case where the CD laser power control unit LPcd_14 and the DVD laser power control unit LPdvd_12 have different control polarities, the polarity of the polarity-reversible operational amplifier 4' is reversed depending on the diode to be driven (i.e., either the laser diode LD1 or the laser diode LD2).

Fifteenth Embodiment

Figure 15:
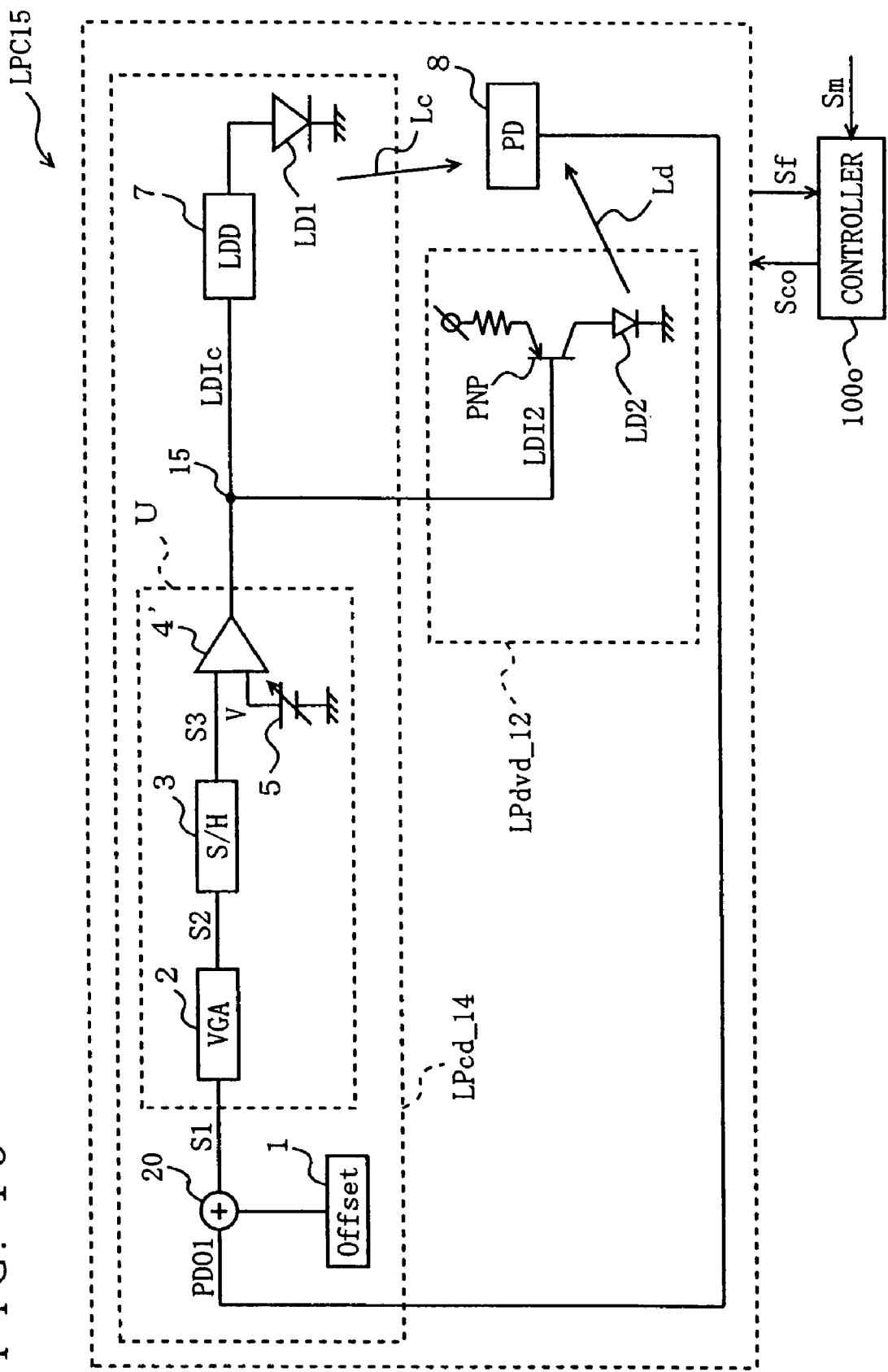
FIG. 15 is a block diagram illustrating a configuration of a laser power control apparatus according to a fifteenth embodiment of the present invention.

Referring to FIG. 15, a laser power control apparatus according to the present embodiment will be described. The configuration of a laser power control apparatus LPC15 is the same as that of the laser power control apparatus LPC14 shown in FIG. 14, except that the controller 100n is replaced with a controller 100o.

In the present embodiment, a polarity-reversible operational amplifier 4' includes therein a switch SW1 and a switch SW2. By controlling the operation timing of the two types of switches SW1 and SW2 by the controller 100o, the output polarity can be reversed.

Sixteenth Embodiment

Figure 16:
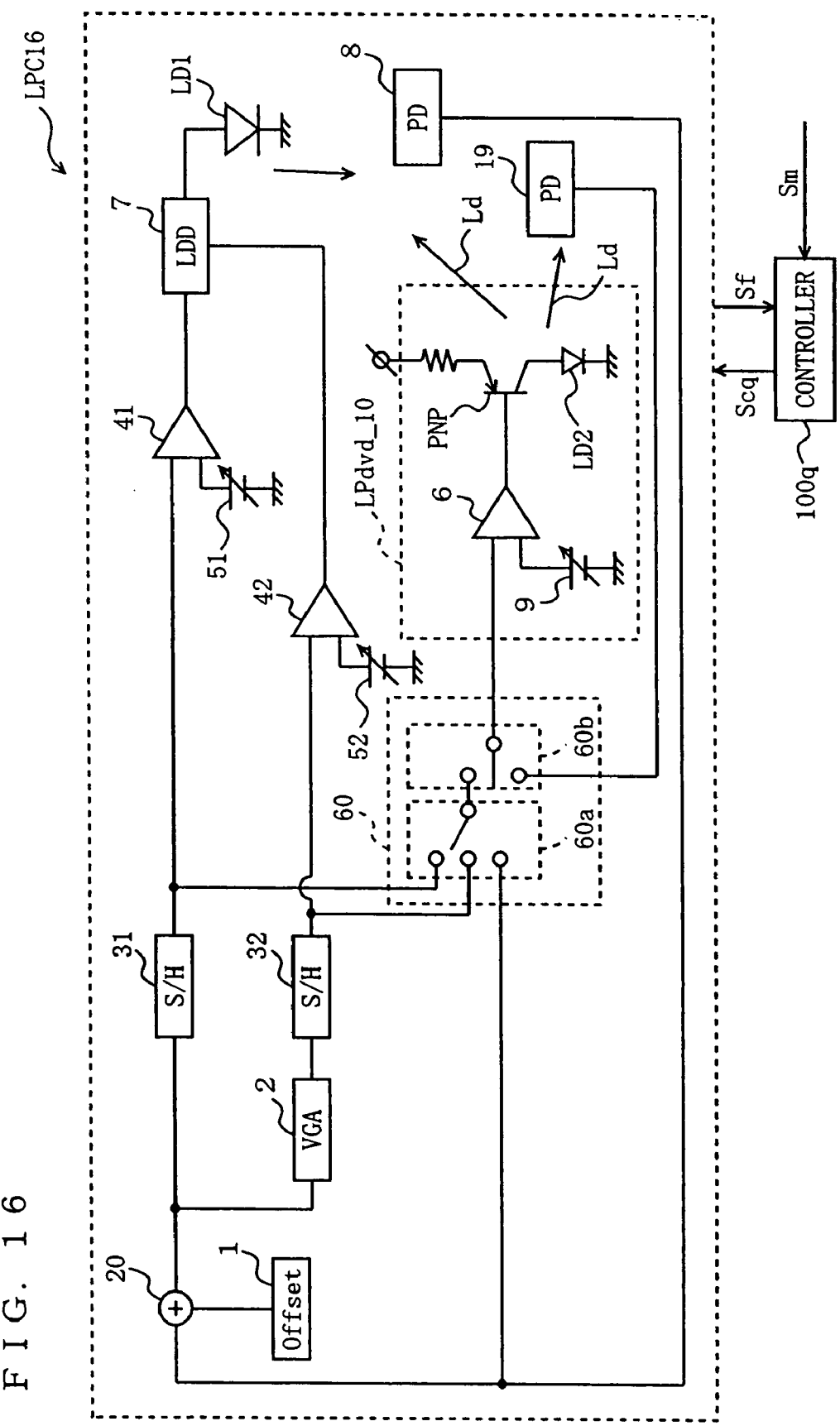
FIG. 16 is a block diagram illustrating a configuration of a laser power control apparatus according to a sixteenth embodiment of the present invention.

Referring to FIG. 16, a laser power control apparatus according to the present embodiment will be described. As shown in FIG. 16, a laser power control apparatus LPC16 includes a laser diode LD1, laser drive circuit 7, a front monitor 8, a back monitor 19, an operational amplifier 41, a variable voltage source 51, a sample/hold circuit 31, a sample/hold circuit 32, a variable gain circuit 2, an offset adjuster 1, an adder 20, an operational amplifier 42, a variable voltage source 52, a switch 60, a DVD laser power control unit LPdvd_10, and a controller 100q. The operational amplifiers 41 and 42 are each composed of a negative comparator, and an operational amplifier 6 is composed of a positive comparator.

The switch 60 includes a switch 60a and a switch 60b. The switch 60a selects one of the front monitor 8, the sample/hold circuit 32, and the sample/hold circuit 31 based on the intensity of an output signal from the back monitor 19. The switch 60b selects either the switch 60a or the back monitor 19 based on the intensity of an output signal from the back monitor 19. Specifically, the switch 60 selects one of the outputs from the sample/hold circuit 31, the sample/hold circuit 32, and the front monitor 8 based on an output from the back monitor 19 and outputs the selected output to the DVD laser power control unit LPdvd_10. Note that the order of connection of the offset adjuster, the variable gain circuit, and the sample/hold circuit is not limited to that described above; the order of connection may be changed appropriately.

Next, the operation of the controller 100q will be described. The controller 100q generates a control signal Scq based on an operation mode signal Sm and controls the laser power control apparatus LPC16. Specifically, in the case where the CD drive is used, the operational amplifier 6 is turned off so that a laser diode LD2 will not emit light.

On the other hand, in the case where the DVD drive is used, the controller 100q controls the components in the following manner.

In the case where the switch 60a selects the sample/hold circuit 31 and the switch 60b selects the switch 60a, the controller 100q turns off the variable gain circuit 2, the sample/hold circuit 32, the operational amplifier 41, and the operational amplifier 42. Then, when the laser diode LD1 or LD2 emits light, the controller 100q changes the offset value of the offset adjuster 1. The sample/hold circuit 31 is allowed to operate at all times.

In the case where the switch 60a selects the sample/hold circuit 32 and the switch 60b selects the switch 60a, the controller 100q turns off the sample/hold circuit 31, the operational amplifier 41, and the operational amplifier 42. Then, when the laser diode LD1 or LD2 emits light, the controller 100q changes the offset value of the offset adjuster 1 and the gain of the variable gain circuit 2. The sample/hold circuit 32 is allowed to operate at all times.

In the case where the switch 60a selects the back monitor 19 and the switch 60b selects the switch 60a, the controller 100q turns off the offset adjuster 1, the variable gain circuit 2, the sample/hold circuit 31, the sample/hold circuit 32, the operational amplifier 41, and the operational amplifier 42.

In the case where the switch 60b selects the back monitor 19, the controller 100q turns off the offset adjuster 1, the variable gain circuit 2, the sample/hold circuit 31, the sample/hold circuit 32, and the operational amplifier 41, and the operational amplifier 42.

This configuration allows the controller to select from a plurality of characteristics depending on the situation, whereby flexibility is increased. Further, since the back monitor can be used, it is also possible to control a laser power in a conventional system. Therefore, this configuration can be applied to combination drives where a reduction in size is sought.

While the invention has been described in detail, the foregoing description is in all aspects illustrative and not restrictive. It is understood that numerous other modifications and variations can be devised without departing from the scope of the invention.

What is claimed is:

1. A laser power control apparatus for controlling an output of laser light which is exclusively applied onto a first optical disk and a second optical disk in a combination drive to record or read information thereon or therefrom, the apparatus comprising:

first laser light generating means for generating first laser light to be applied onto the first optical disk;

first drive current generating means for generating a drive current of the first laser light generating means;

second laser light generating means for generating second laser light to be applied onto the second optical disk;

second drive current generating means for generating a drive current of the second laser light generating means;

laser light intensity detection means for exclusively collecting the first laser light and the second laser light and generating a first laser light intensity signal which indicates an intensity of the collected laser light;

first laser light generating current control means for controlling the first laser light generating means based on the first laser light intensity signal;

second laser light generating current control means for controlling the second laser light generating means based on the first laser light intensity signal;

second laser light intensity detection means for collecting the second laser light and generating a second laser light intensity signal;

a first sample/hold circuit for sampling and holding the first laser light intensity signal;

a variable gain circuit for amplifying the first laser light intensity signal with a predetermined gain;

a second sample/hold circuit for sampling and holding the first laser light intensity signal having been amplified with the predetermined gain;

a first switch for selecting one selected from the group consisting of an output from the first sample/hold circuit, an output from the second sample/hold circuit, and the first laser light intensity signal, based on the second laser light intensity signal, and outputting the selected one;

and a second switch for selecting one of an output from the first switch and the second laser light intensity signal based on the second laser light intensity signal, and outputting the selected one, wherein the second laser light generating current control means controls the second laser light generating means based on the output from the second switch.

2. The laser power control apparatus according to claim 1, wherein the first laser light generating a current control means comprises:

a first operational amplifier for receiving the output from the first sample/hold circuit, and a second operational amplifier for receiving the output from the second sample/hold circuit, and the second laser light generating current control means comprises a third operational amplifier from receiving the output from the second switch.

3. The laser power control apparatus to claim 2, wherein the first operational amplifier is composed of a negative comparator, the second operational amplifier is composed of a negative comparator, and the third operational amplifier is composed of a positive comparator.

* * * * *